United States Patent [19]

Lin

[11] 4,105,483

[45] Aug. 8, 1978

[54] PRINTING INK TRANSFER PROCESS

[75] Inventor: Liang-Chuan Lin, Taipei, Taiwan

[73] Assignee: Globe Industries Corporation, Taipei, Taiwan

[21] Appl. No.: 768,453

[22] Filed: Feb. 14, 1977

[51] Int. Cl.[2] ........................ B32B 31/22; B32B 31/12; B32B 31/20

[52] U.S. Cl. .................................... 156/154; 156/235; 156/236; 156/240; 156/241; 156/310; 156/314; 156/328; 156/332; 156/334; 260/17 R; 427/149; 427/152; 428/914

[58] Field of Search ............... 156/236, 235, 240, 277, 156/316, 318, 328, 334, 249, 154, 155, 314, 230, 241, 308, 309, 310, 314, 332; 427/149, 152; 428/914; 106/196; 260/17 R

[56] References Cited

U.S. PATENT DOCUMENTS

| | | | |
|---|---|---|---|
| 1,902,257 | 3/1933 | Moss | 260/17 R |
| 1,950,662 | 3/1934 | Dreyfus | 260/17 R |
| 2,273,568 | 2/1942 | Fishel | 156/240 X |
| 2,489,987 | 11/1949 | Barnola | 156/235 X |
| 2,606,853 | 8/1952 | Reese et al. | 156/240 X |
| 2,654,687 | 10/1953 | Fridolph | 156/241 X |
| 3,344,012 | 9/1967 | Af Ström | 156/235 X |

*Primary Examiner*—Douglas J. Drummond
*Assistant Examiner*—Thomas Bokan
*Attorney, Agent, or Firm*—Ladas, Parry, Von Gehr, Goldsmith & Deschamps

[57] ABSTRACT

A process for transferring printed information, in the form of printing ink, from a printed paper to a non-porous substrate by the application of a solvent to the surfaces of an adhesive coating on the printed information surface and a surface of the substrate, followed immediately by the application of pressure to unite the adhesive surfaces together and the subsequent dissolution and removal of the paper leaving the printed information attached to the substrate by means of the adhesive.

14 Claims, 4 Drawing Figures

PRINTING INK TRANSFER PROCESS

The present invention relates to a printing ink transfer process and apparatus in which printed information in the form of printing ink is transferred to a non-porous substrate, for example, a synthetic resin substrate.

In the past color images on non-porous substrates have been produced by photographic processes, printing on cellophane and attaching the printed cellophane to the substrate by means of an adhesive, a tranfer process involving the use of a release agent between a carrier and the information to be attached to the substrate.

The photographic method mentioned is expensive and produces an image which while satisfactory initially, quickly fades to an unacceptable extent.

Attaching a printed cellophane sheet to a non-porous substrate by adhesive results in an entirely unsatisfactory product as a result of the poor quality of print obtained by printing on cellophane, delamination which occurs even at room temperatures which results in the cellophane peeling away from the substrate, lack of definition of the printed subject matter, undue expense and low resistance to ambient heat.

The conventional transfer arrangement using a release agent is unsatisfactory for large products or printed information of great complexity and is relatively expensive.

It is an object of the present invention to provide a process capable of transferring complex high definition multi-color printed subject matter from the printed paper upon which it was printed onto a non-porous substrate, for example, a synthetic resin board, without apparent deterioration in quality of the printed image. It is a further object to provide such a process capable of producing a product substantially more resistant to fading than photographic processes and more resistant to ambient temperature and delamination while also having a significant economic advantage over the prior art processes.

According to the present invention there is provided a process for transferring printed information consisting of printing ink, from a printed surface of a printed paper carrier to a substrate having at least one smooth substantially non-porous surface, comprising the steps of applying transparent adhesive to the printed surface to form a coating of adhesive thereon; applying transparent adhesive to the smooth surface to form a coating of adhesive thereon; when said adhesive is dry, simultaneously applying a solvent for the adhesive to the coated surfaces of the printed paper and the substrate; when the solvent has activated the exposed surfaces of the adhesive coatings and before the entire coating has been affected by the solvent, pressing the activated surfaces together to unite the adhesive coatings and squeeze any excess solvent from between the coatings; and when the united adhesive is dry, applying a solvent for the paper to the paper and removing the dissolved paper thereby leaving the printed information attached to the substrate by means of said adhesive.

In a preferred form of the process the above steps are repeated in sequence, with the exception of the step for applying adhesive to the substrate which is omitted, to add further layers of printed information superimposed in registration with the printed information attached to said substrate in said steps. Subsequently a backing layer may be added to protect the adhesive and printing ink attached to the substrate.

The invention also provides a method which may be practiced in an apparatus for transferring printed information consisting of printing ink, from a printed surface, coated with adhesive of a printed paper carrier to an adhesive coated smooth substantially non-porous surface of a substrate comprising, a first solvent applicator for simultaneously applying a solvent to adhesive coated surfaces of the printed paper and the substrate, a pressure applicator to press the solvent activated surfaces together to unite the adhesive coatings and squeeze any excess solvent from between the coatings, a second solvent applicator to apply a paper solvent to the paper and means to remove the dissolved paper to leave the printed information attached to the substrate by means of said adhesive.

An apparatus and process according to the invention will now be described, by way of example, with reference to the accompanying drawings.

Figure 1:
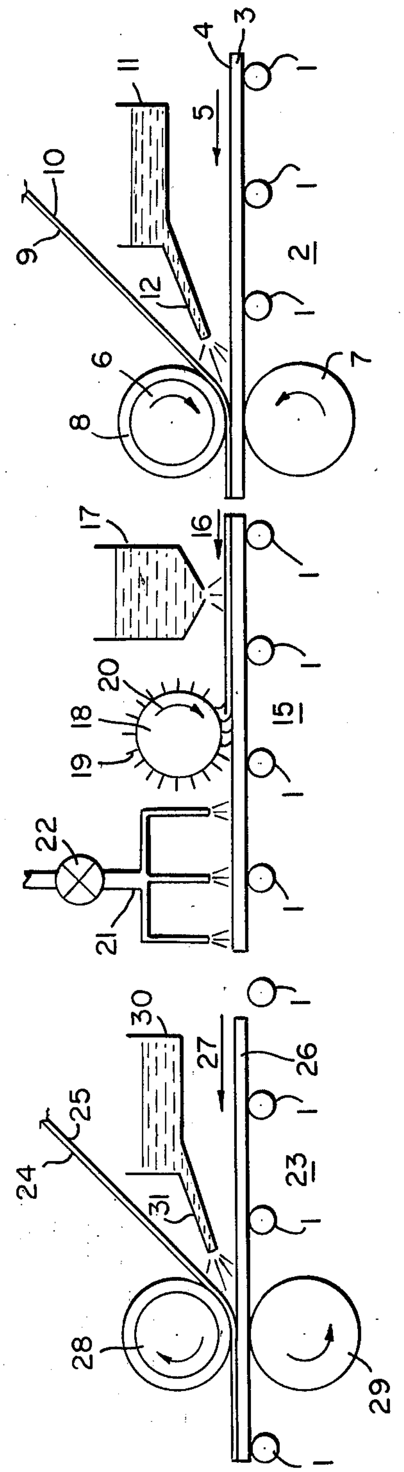
FIG. 1 is a diagrammatic representation of apparatus in accordance with the invention.

With reference to FIG. 1 a roller conveyor is diagrammatically represented by freely rotatable rollers 1 with all of the rollers lying in a single horizontal plane. In a first section 2, rollers 1 are arranged to support a substrate 3, coated on its upper surface 4 with an even continuous coating of transparent adhesive, for passage in the direction of arrow 5, between horizontal pressure rollers 6 and 7. Roller 6 has a rigid core with an exterior surface layer 8 of a resilient material such as a synthetic rubber (e.g., "Neoprene") and roller 7 is a rigid cylindrical steel roller. Rollers 6 and 7 are arranged to press a printed paper 9 (e.g., a poster) which consists of a paper backing carrying, on its face 10, printed information, comprising printing ink, over which is an even continuous coating of a transparent adhesive.

A solvent carrying tray 11 with output spray nozzle 12 is disposed adjacent the input nip of rollers 6 and 7 to spray the coated upper surface 4 and coated face 10 immediately before and as substrate 3 with superimposed paper 9 are fed between pressure rollers 6 and 7. The pressure applied by pressure rollers 6 and 7 is sufficient to squeeze excess solvent from between the substrate 3 and the printed paper 9 to unite the coatings. The solvent carried by tray 11 and sprayed by nozzle 12 activates the exposed surface of the adhesive which coats surface 4 and face 10 and the positioning of nozzle 12 in relation to rollers 6 and 7 is such that as the superimposed substrate 3 and printed paper 9 are fed between pressure rollers 6 and 7 the solvent sprayed by nozzle 12 has time only to effect the surface of the adhesive coatings which are to be pressed into contact by rollers 6 and 7.

It will be appreciated that rollers 6 and 7 may be manually turned or turned by a motor (not shown).

Figure 2:
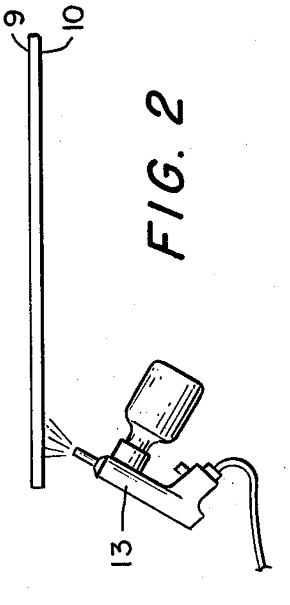
FIG. 2 is a diagrammatic representation of a spray gun spraying adhesive onto printed paper.
Figure 3:
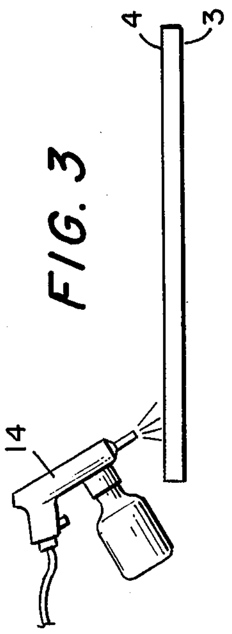
FIG. 3 is a diagrammatic representation of a spray gun spraying adhesive onto a substrate.

With respect to the coating of the substrate 3 and printed paper 9 with a layer of adhesive as described with reference to section 2 of FIG. 1, attention is drawn to FIG. 2 and FIG. 3 which respectively show spray guns 13 and 14 (of any well-known type) which may be used to spray continuous even coatings of transparent adhesive on surface 4 and face 10. It will be appreciated that this may be done manually or by automatic spraying apparatus in a manner well-known in the art of spraying of coatings onto surfaces.

Following passage of the substrate 3 and superimposed printed paper 9 between rollers 6 and 7 and now joined adhesive coatings are allowed to dry to form a laminate consisting in order of substrate 3, a layer of adhesive, a layer of printing ink and a layer of paper 9. Following drying the laminate is passed to the second section 15 of the apparatus. Section 15, located on a continuation of the roller conveyor, is a paper stripping section in which the paper of the printed paper 9 is removed, by use of a solvent, a scrubber and a rinsing agent, to leave the laminate formed in section 2 with the paper, on which the printed matter was printed, removed. The laminate produced in section 12 is passed through section 15 in the direction of arrow 16 by either manual or mechanical means. During the passage of this laminate through section 15 it is first subjected to a spray of solvent issued by a solvent tank and nozzle 17, the solvent being of a formulation which will soften and dissolve the paper of the printed paper 9 without significant dissolution or disturbance of the printed information printed thereon. The laminate is then transported in the direction of arrow 16, to a scrubber roller 18. The rate of transport is such as to permit sufficient time for the solvent to soften and substantially dissolve the paper backing before reaching the bristles 19 of the scrubber roller 18. The bristles remove the dissolved and partially dissolved paper, leaving the printed information, in the form of printing ink, intact on the surface of the adhesive. The scrubber roller 18 rotates in the direction of arrow 20 at a peripheral speed substantially exceeding the rate of transport of the laminate through section 15. The bristles 19 of scrubber roller 18 may be constructed of any suitable material as will be readily apparent to a man skilled in the art and are chosen to have a stiffness sufficient to remove the dissolved or partially dissolved paper without materially disturbing or destroying the printed information which is to remain on the laminate. Preferred bristles are constructed of a Nylon (Registered Trade Mark) with the outer ends of the bristles rounded to avoid undue abrasiveness.

Following scrubbing with the scrubber roller 18 the laminate passes under a rinsing head 21 which is connected by way of valve 22 to a supply of water (not shown). Water from the rinsing head 21 washes the loosened particles of dissolved and partially dissolved paper from the laminate leaving the layers of the substrate 3, adhesive and printed information 10 intact.

Following the dissolving, scrubbing and rinsing actions which occur in section 15 the laminate is allowed to dry before recycling through sections 2 and 15 to build up additional layers of adhesive and printed information used to increase the density of color of printed information by the superimposition of a plurality of layers of printing ink in registration. For laminates which are to be illuminated by back-lighting, two or three such superimposed layers of printed information are usually required, while in the case of an opaque substrate 3, which is to be illuminated from the viewing side only, a single layer of printed information may well suffice.

During each recycling step an additional and identical printed paper 9 is utilized. After desired recycling, the laminate is passed to the third section 23 of the apparatus for the application of a backing layer 24. The backing layer 24, which may be opaque, translucent or transparent, is coated on surface 25 with a continuous coating of transparent adhesive compatible with the adhesive utilized in the lamination taking place in sections 2 and 15 and activatable by a solvent which will also activate the adhesive utilized in the manufacture of the laminate in sections 2 and 15.

The laminate 26 produced in sections 2 and 15 is passed through section 23 in the direction of arrow 27 between pressure rollers 28 and 29. These may be rotated manually or by a motor (not shown) in the same manner as rollers 6 and 7. Roller 28 is a resiliently covered roller similar to roller 6. The backing sheet 24 is superimposed over the adhesive and printing ink covered surface of substrate 3 with adhesive 25 sandwiched therebetween. A solvent tray 30 and nozzle 31 is disposed in section 23 to spray solvent into the entry nip of rollers 28 and 29 immediately prior to the passage of the superimposed backing layer 24 and laminate 26 between these rollers. The rollers squeeze excess solvent from between the backing layer 24 and laminate 26 and press the backing layer 24 into lamination with the laminate 26. The backing layer 24 provides a protective layer for the layers of adhesive and printing ink formed on the substrate 3. Following passage through rollers 28 and 29, the adhesive dissolved by the solvent issuing from nozzle 31 is allowed to harden to produce a unitary structure which may then be utilized in any desired manner.

Figure 4:
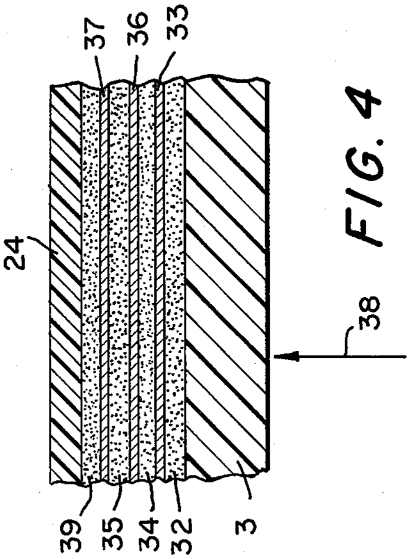
FIG. 4 is a fragmentary cross-section of a product of the apparatus and process of the present invention.

In a process using the apparatus shown in FIG. 1 in which three layers of printing ink are attached to substrate 3 an arrangement will be produced as shown in FIG. 4. Here substrate 3 has a coating of adhesive 32 which is a combination of the adhesive applied to surface 4 of substrate 3 prior to its first passage through sections 2 and 15 and the adhesive applied to the first printed paper 9 used in the production of the resulting laminate. To this adhesive layer 32 is attached the printed information from the first used printed paper 9. Superimposed upon layers 32 and 33 are layers of adhesive 34 and 35 which alternate with additional layers of printed information 36 and 37 which are superimposed in registration over the printed information layer 33 to have the appearance, when looking in the direction of arrow 38, of a single representation of the printed information. Finally, the backing layer 24 with its layer of adhesive 39 follows to produce the completed laminate, in this instance, having three superimposed layers of printing ink.

The process of the present invention may be carried out in the apparatus described with reference to FIG. 1. However, it will be appreciated that the process, hereinafter particularly described, does not necessarily involve the use of apparatus such as that described with reference to FIG. 1 and that this process exhibits the inventive concept of the present invention even when such apparatus as that described with reference to FIG. 1 is not used.

The process to be described will be described with reference to the use of a substrate which is a transparent acrylic sheet upon which the layers of printing ink and adhesive are deposited before a backing layer of translucent white acrylic sheet is attached to the exposed printing ink surface of the intermediate laminate.

An even continuous coating of a vinyl glue (polyvinyl acetate copolymer) is formed on one surface of the substrate and allowed to dry. A similar even continuous coating of vinyl glue is formed on the face of a printed paper which carries the printed information, in the form of printing ink, the transfer of which is desired. This coating is also allowed to dry.

At a temperature excess of 15° C. solvent in the form of approximately equal parts of benzene and toluene in admixture is applied to the adhesive coated surfaces of both the printed paper and the substrate. The solvent activated surfaces of the coatings of the printed paper and substrate are then brought into contact with one another and pressure is applied across the thickness of the paper and substrate to squeeze excess solvent from between the paper and the substrate and to produce a uniform bond between the surfaces of the adhesive coatings to produce a uniform integral layer of substantially void free adhesive between the substrate and the printing ink surface of the paper. The period of time between the application of the solvent and the application of pressure to produce the integral uniform layer of adhesive is chosen to be sufficient to ensure adequate wetting of the surface of both coatings while being insufficient to permit the dissolution of the entire thickness of the coatings concerned. This period which will differ with the thickness of coating, particular adhesive composition used and temperature, may be easily ascertained by simple experiment. In a manually operated process a period of 1 to 2 seconds has been found appropriate and, further, has not been found to be particularly critical.

The adhesive layer joining the printed paper and substrate is then allowed to dry to form a laminate, the layers of which consist in order of the substrate, adhesive printing ink and paper.

Solvent for the paper is then applied to the paper layer by either brushing or spraying. This solvent which is chosen to dissolve the paper backing without materially effecting the layer of printing ink beneath or the adhesive to which the printing ink is attached, comprises sodium hydroxide and water in admixture in the proportions of approximately five parts of sodium hydroxide to 100 parts water, by weight. Effectiveness of the solution is improved if the solvent is heated to from 40° C. to 60° C. One part of hydrochloric acid to 100 parts of the water may advantageously be added to the solution. The admixture given assumes a concentration of in excess of 70% with respect to both the sodium hydroxide and hydrochloric acid. Following application of the paper solvent, the dissolved paper is removed from the laminate by scrubbing and rinsing with water.

When the laminate is dry it is either recycled through the above described stages of the process for the application of additional layers of adhesive and printing ink thereby to increase the density of the representation produced by the printing ink, or a backing layer is applied to produce a finished product.

In the event of a recycling of the laminate, no initial adhesive coating is applied to the laminate already produced. During this recycling the adhesive solvent is applied to the existing surface of the substrate carrying the printing ink and to a dry even continuous coating of vinyl glue applied to the printed information surface of the printed paper concerned, before this printed paper is pressed into contact with the existing laminate, to produce laminate comprising in order substrate, adhesive, printed information, adhesive, printed information and paper. It will be appreciated that the printed information involved in the first steps of the process is identical with that used in the recycling and that the superimposed layers of printed information are carefully arranged in registration with one another thereby to appear as a single printed image when viewed in a normal manner. Apart from the omission of the step of applying adhesive to the laminate, the recycling steps of the process are substantially identical with those previously carried out up to and including the removal of the paper layer.

The example of the invention with respect to which the present process is described will usually require two recycling stages in order to produce a desirable density of color in the printed information formed by the printing ink. With these two stages of recycling, three layers of printing ink are produced and the product, after application of a backing layer, will in cross-section appear as diagrammatically represented in FIG. 4. A product such as this is suitable for back lighting to produce an illuminated display of high quality. In some instances only one recycling stage will be required and in cases where the substrate or backing layer are of an opaque material (e.g., marble), recycling may be unnessary as the transfer of a single layer of printing ink may suffice to produce the desired density of color in the printed information transferred.

When the desired number of superimposed layers of printing ink have been transferred to the substrate and the paper removed, the resulting laminate has a backing layer applied in order to protect the superimposed layers of printing ink. In this example the backing layer is of the same material as the substrate and utilization of the same adhesive used in the laminating process is appropriate for its application. An even continuous coating of the adhesive is formed on the backing layer and allowed to dry. Solvent, consisting of approximately equal parts of benzene and toluene in admixture, is applied to the printing ink surface of the laminate and to the adhesive coating of the backing layer. The activated surface of the printing ink layer and the coating of the backing layer are then brought into contact and pressure applied to produce a uniform bond between the coatings of the backing layer and the laminate and to squeeze any excess solvent from between the laminate and the backing layer. When the adhesive has dried, the product is finished.

While in the particular description of the apparatus and process, reference has been made to substrates which are planar and, by implication, to backing layers which are planar, it will be appreciated that the apparatus and process may readily be utilized by those skilled in the art, without further inventive advance, to transfer printing ink onto single curvature surfaces. It will also be appreciated that while the substrate has, by implication, been regarded as a rigid substrate, that the invention is also applicable to the transfer of printed information to flexible substrates, for example, polyvinyl chloride.

Examples of materials from which the substrate and backing layer may be constructed are acrylic, acetate, polyvinyl chloride (P.V.C.), polyester, "Celluloid", "Nylon", "Teflon", glass, marble, aluminum. It will be appreciated that when these materials are used in combination to form a product according to the present invention, except in products with the backing layer omitted, the material of either the backing layer or the substrate will normally be chosen to be transparent.

It will be appreciated that it is not essential for the adhesive used in the coating of the substrate to be the same as the adhesive used for the coating of the printed paper and that the adhesive used to coat the backing layer may be different from that used on the substrate and/or the printed paper. The only requirement is that the adhesives which come into communication with one another are compatible (i.e., will bond or unite together to form a permanent transparent joint).

As used herein the term "transparent adhesive" means an adhesive which is transparent when dry.

Reference is made herein to activation of the exposed surfaces of adhesive coatings by the application of a solvent. This "activation" means placing the exposed surface of the adhesive coating into a condition in which it will bond or unite with another such activated surface of an adhesive coating, upon application of pressure.

While the particular description of apparatus and process refers to the provision of a backing layer which is attached by adhesive to the laminate previously produced, it will be appreciated that the printed information and adhesive layers exposed on one surface of the substrate may be protected by a layer of material formed thereon by any well known means, including the spraying of a protective coating.

While the particular description refers to the removal of the solvent and dissolved paper backing by scrubbing with a brush, it will be appreciated that the scrubbing step may be achieved by other means, for example, jets of liquid or gas, and that the term "scrubbing" is to be construed as including these.

Commercially available polyvinyl acetate copolymer adhesives provide satisfactory results on substrates and backing layers of acrylic, acetate and P.V.C. and may also be found appropriate for use when the substrate or backing layer is constructed of glass, metal or pocelain. Polyvinyl acetate copolymer adhesive also provides the desired adhesion to the printing ink of the printed informtion and is therefore appropriate for use as the coating on the printed paper.

An alternative adhesive for use with acrylic, acetate or P.V.C. substrates and backing layers, and for use on the printed paper, consists of an admixture of cellulose acetate, acetone, rosin, polystyrene and a solvent or solvent mixture. While a wide range of proportions of these materials will result in an effective adhesive, it has been found that the following proportions by weight produce an adhesive having the desired characteristics for the process concerned:

Cellulose Acetate — about 12 to about 20 parts
Acetone — about 36 to about 60 parts
Rosin — about 3 to about 5 parts
Polytyrene — about 3 to about 5 parts.

To this desired admixture is added appropriate quantity of a suitable solvent or solvent mixture to permit the application of the adhesive in a desired manner to produce an even continuous adhesive coating. Where the adhesive is to be sprayed to form the coating, from about 5 to about 20 parts of solvent to each 10 parts of the admixture produced from the above proportions of cellulose acetate, acetone, rosin and polystyrene has been found effective.

The optimum admixture of constituents for the adhesive, including the solvent, will depend on the method of application, the time periods involved in preparation on application of the adhesive and ambient conditions (particularly temperature). With the process particularly described and on the basis of an ambient temperature of 20° C., the following admixture in proportions by weight is preferred:

Cellulose Acetate — 16 parts
Acetone — 48 parts
Rosin — 4 parts
Polystyrene — 4 parts
Toluene (solvent) — 72 parts, in this preferred form of adhesive toluene, the preferred solvent, is utilized.

The solvent used to activate exposed surfaces of adhesive coatings formed from cellulose acetate, acetone, rosin, polystyrene, and a solvent, may be any suitable solvent. However, benzene and toluene in admixture, preferably in equal parts by weight, has been found appropriate for use at ambient temperatures above 15° C. At temperatures below 15° C. chlorobenzene may be added in the proportion of 1 part chlorobenzene to 20 parts by weight of the admixture of benzene and toluene.

When the material of the substrate or backing layer is aluminum, marble, polyester, "Celluloid", glass, "Nylon", or "Teflon", the above adhesive containing cellulose acetate, acetone, rosin and polystyrene may be utilized in the proportions specified by ranges and in the specified preferred form providing a suitable solvent is utilized. The solvent is utilized in the range of proportions and preferred proportion specified above and preferably is ethyl alcohol.

When an adhesive form utilizing alcohol as a solvent is used, the solvent for activating the exposed surfaces of the adhesive is any suitable solvent and is preferably an admixture of ethyl alcohol and methyl ethyl ketone, preferably in equal parts by weight. Again, where the ambient temperature is below 15° C., chlorobenzene in the proportion of 1 part to 20 parts by weight of the admixture of ethyl alcohol and methyl ethyl ketone is added.

A dilute caustic soda solution is an effective solvent for paper and this may have the proportions of between 400 and 600 grams of caustic soda flakes dissolved in 10 liters of water. This dilute solution is preferably used at a temperature of between 40° C. and 60° C. A preferred paper solvent is a caustic soda solution to which a quantity of hydrochloric acid has been added. This admixture may comprise 400 to 600 grams of caustic soda flakes, 80 to 120 cubic centimeter of hydrochloric acid and 10 liters of water. A preferred admixture is 500 grams of caustic soda flakes, 100 cc of hydrochloric acid and 10 liters of water.

It will be appreciated that in a case where the paper carrying the printed information is water-soluble the paper solvent may preferably be water.

It will also be appreciated that the adhesive, adhesive solvent, paper solvent and rinse liquid may be applied by any appropriate means including, for example, spraying, brushing or dipping.

The adhesive utilized in the process and apparatus herein described is an adhesive or adhesive combination which will adhere to printing ink used in the production of the printed paper used and to the substrate involved.

What is claimed is:

1. A process for transferring printed information alone from a printed surface of a printed paper to a substrate having at least one smooth substantially nonporous surface, the printed information consisting of printing ink imprinted on the paper without any intermediate layer of material therebetween, comprising the steps of:

a. applying transparent adhesive to the printed surface to form a coating of adhesive thereon;

b. applying transparent adhesive to the smooth surface to form a coating of adhesive thereon;

c. when said coatings of adhesive are dry, applying an adhesive solvent to at least one of the coated surfaces of the printed paper and the substrate;

d. when the solvent has activated the exposed surface of the adhesive coating to which the solvent has been applied and before the entire coating to which the solvent has been applied has been penetrated by the solvent, pressing the activated surfaces together to unite the adhesive coatings and to squeeze any excess solvent from between the coatings; and e. when the united adhesive is dry, applying a paper solvent to the paper and removing the dissolved paper thereby leaving the printed information attached to the substrate by means of said adhesive.

2. A process according to claim 1, wherein following step (e.), steps (a.), (c.), (d.), and (e) are repeated in sequence a desired number of times, each time using a further printed paper carrying printed information thereon to add a further layer of printed information and adhesive to the substrate;

d. when repeated including bringing the activated surfaces together with printed information to be added superimposed in registration with the printed information already attached to said substrate thereby to produce a laminate consisting of the substrate, adhesive and a desired plurality of layers of the printed information in registration with one another.

3. A process according to claim 2, where the desired number is two, thereby to produce three layers of printed information.

4. A process according to claim 1, comprising the additional steps of:

f. applying a coating of adhesive to a backing layer of material to form a coating of adhesive on a surface thereof, the backing adhesive being compatible with the adhesive used in steps (a.) and (b.);

g. when the adhesive on the backing layer is dry, simultaneously applying a solvent to the printed information carrying coated surface of the substrate and the coated surface of the backing material;

h. when the solvent applied in step (g.) has activated the exposed surfaces of the adhesive coatings to which it has been applied and before these coatings have been penetrated by this solvent, pressing these activated surfaces together to unite the adhesive coatings and to squeeze any excess solvent from between the coatings, thereby to produce a laminate of substrate and backing material with the transferred printed information and the adhesive therebetween.

5. A process according to claim 2, comprising the subsequent additional steps of:

f. applying a coating of adhesive to a backing layer of material to form a coating of adhesive on a surface thereof, the backing adhesive being compatible with the adhesive used in steps (a.) and (b.);

g. when the adhesive on the backing layer is dry, simultaneously applying a solvent to the printed information carrying coated surface of the substrate and the coated surface of the backing material; and h. when the solvent applied in step (g.) has activated the exposed surfaces of the adhesive coatings to which it has been applied and before these coatings have been penetrated by this solvent, pressing these activated surfaces together to unite the adhesive coatings and squeeze any excess solvent from between the coatings, thereby to produce a laminate of substrate and backing material with the transferred printed information and the adhesive therebetween.

6. A process according to claim 1, wherein, in step (e.), the dissolved paper is removed by scrubbing and rinsing.

7. A process according to claim 2, wherein, in step (e.), the dissolved paper is removed by scrubbing and rinsing.

8. A process according to claim 1, wherein the substrate is constructed of acrylic, acetate, P.V.C., polyester, nylon, polytetrafluorethylene, camphor-plasticized pyroxylin, glass, aluminum or marble and the adhesive coatings are produced by an adhesive which consists of cellulose acetate, acetone, rosin, polystyrene and a solvent or solvent mixture for these, in admixture.

9. A process according to claim 8, wherein the adhesive, apart from the solvent or solvent mixture, in parts by weight, comprises:

cellulose acetate — about 12 to about 20 parts
acetone — about 36 to about 60 parts
rosin — about 3 to about 5 parts
polystyrene — about 3 to about 5 parts.

10. A process according to claim 9, where the adhesive, apart from the solvent or solvent mixture, in parts by weight, comprises:

cellulose acetate — 16 parts
Acetone — 48 parts
Rosin — 4 parts
Polystyrene — 4 parts 11. A process according to claim 8, wherein the substrate is acrylic, acetate or P.V.C. and the solvent is toluene.

12. A process according to claim 8, wherein the substrate is polyester, nylon, polytetrafluorethylene, camphor-plasticized pyroxylin, glass, aluminum or marble and the solvent is ethyl alcohol.

13. A process according to claim 1, wherein, in step (c.), solvent is applied simultaneously to both coated surfaces.

14. A process for transferring printed information alone, from a printed surface of a printed paper to a substrate having at least one smooth substantially nonporous suface, the printed information consisting of printing ink imprinted on the paper without any intermediate layer of material therebetween comprising the steps of:

a. applying transparent adhesive to at least said printed surface to form a coating of adhesive thereon;

b. when said adhesive is set, applying a solvent for the adhesive to at least one said surface;

c. pressing said surfaces together to unite them by means of the adhesive and to squeeze any excess solvent from between the surfaces before the entire thicknes of the adhesive has been penetrated by the solvent; and d. when the adhesive is set, applying a paper solvent to the paper and removing the dissolved paper thereby leaving the printed information attached to the substrate by means of said adhesive.

* * * * *